April 16, 1935. E. A. DUNN 1,998,188
KNIFE HANDLE
Filed Nov. 24, 1933
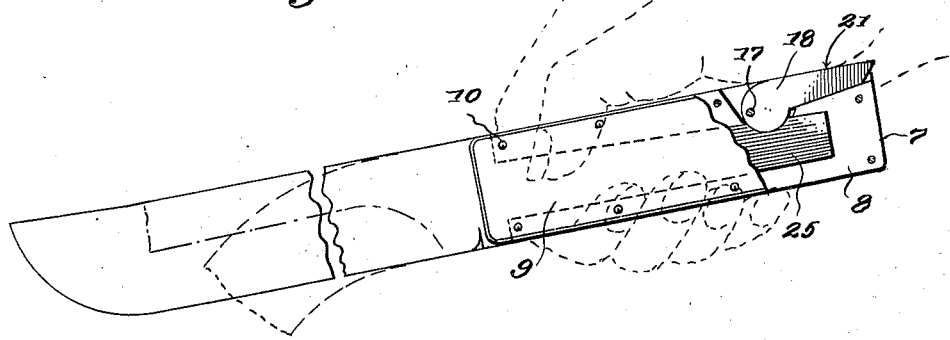
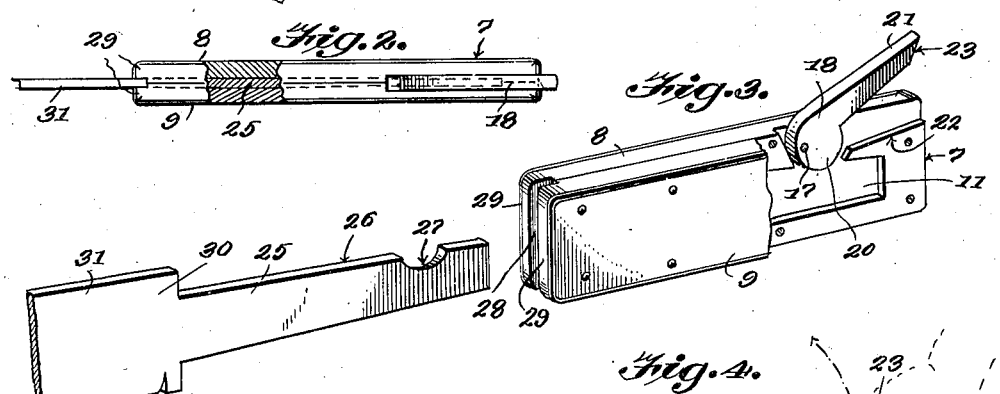
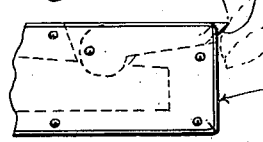
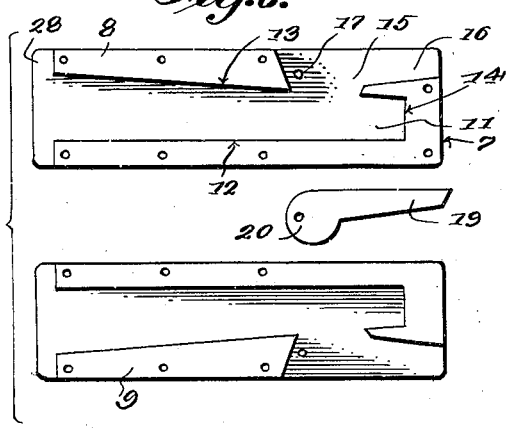
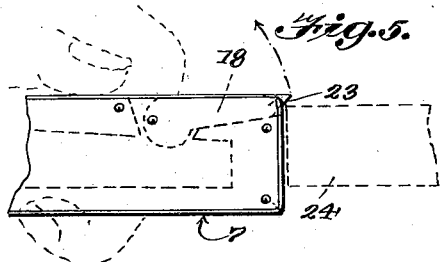
Inventor
EDWARD A. DUNN Patented Apr. 16, 1935

1,998,188

UNITED STATES PATENT OFFICE 1,998,188

KNIFE HANDLE

Edward A. Dunn, Troy, N. Y.

Application November 24, 1933, Serial No. 699,609

1 Claim. (Cl. 30—9)

This invention relates to knife handles and has for one of its objects the production of a simple and efficient means for anchoring the shank of a knife blade firmly within a knife handle so as to prevent the knife blade from becoming accidentally detached from, or loosened within the handle.

A further object of this invention is the production of a simple and efficient eccentric locking means which is adapted to interfit within a suitably designed notch formed in the shank of a knife blade so as to firmly lock the shank of the knife blade within the handle.

A still further object of this invention is the production of a simple and efficient handle especially designed for removably receiving various types of knife blades, the locking means for holding the blade in engagement with the handle being located and constructed in such a manner as to permit the firm holding of the locking means in a locked position while the knife is in operation.

Another object of this invention is the production of a simple and efficient means for facilitating the releasing of the locking means which holds the blade in engagement with the handle.

Other objects and advantages of the present invention will appear throughout the following specification and claim.

In the drawing:—

Figure 1 is a side elevation of the knife handle partly broken away to show the interior of the locking means for the blade and handle, various types of blades being shown, which blades may be removably secured in engagement with the handle;

Figure 2 is a top plan view of the handle showing the blade in position, a portion of the handle and blade being shown in section;

Figure 3 is a perspective view of the handle, certain parts being shown broken away and also illustrating the blade in an extended or removed position, the blade being shown in section;

Figure 4 is a side elevation of a portion of the handle illustrating the manner in which the clamping or locking member may be swung to an open position or released position;

Figure 5 is a side elevation of a portion of a handle illustrating the manner in which the locking or clamping member may be released by striking upon the edge of a table or other object;

Figure 6 is a collective plan view of the two segments of the handle and including the locking member in their relative aligned positions.

By referring to the drawing, it will be seen that 7 indicates the knife handle which preferably comprises a pair of similarly constructed sections 8 and 9. These sections 8 and 9 are preferably secured together by means of suitable fastening rivets or pins 10 which are arranged along or near the edges of the sections 8 and 9 of the handle 7. Each of the sections 8 and 9 is provided with a longitudinally extending channel 11 which is provided with a flat bottom edge 12 and a downwardly inclined outwardly extending upper wall 13 to provide a tapering socket. The end of the channel 11 is provided with an abutment wall 14. The upper wall 13 is interrupted by means of a notch 15 which is outwardly flared toward the rear end of the handle 7 to provide a shank-receiving pocket 16 along the upper edge of the handle 7. Each of the sections 8 and 9 is similarly constructed, as clearly shown in Figure 6.

Pivotally mounted within the notch 15 upon a suitable journal pin 17 is a locking member or lever 18 having an elongated shank portion 19 and a circular inner end 20. The locking member or lever 18 is so mounted upon the journal pin 17 as to cause the upper edge 21 of the lever 18 to lie flush with the upper edge of the handle 7, as shown in Figure 1 when the locking member or lever 18 is swung within the handle to a locking or clamping position. The inward swinging movement of the lever 21 is limited by means of the abutment wall 22. The lever 21 is provided with a beveled outer end 23 which is adapted to normally extend slightly beyond the rear end of the handle 7, as shown clearly in Figures 1, 4 and 5 so as to permit the operator to press his thumb under this extended beveled end 23, as shown in Figure 4, for the purpose of releasing or lifting the locking lever 18. Should the lever become stuck or difficult to swing, the operator may take the handle in his hand in the position shown in Figure 5, and by striking the inclined projecting end 23 of the lever 18, in the manner as illustrated in Figure 5, against the edge of a table or other abutment 24, the locking lever or member 18 may be readily released.

In carrying out the invention, it will be the practice to provide a number of different types of blades, such for instance as is shown in Figure 1, one blade for instance being a skinning knife blade, another a steak knife blade, and a further one a boning knife blade, each of the blades being provided with a suitable shank 25 which is designed to conform to the contour of the channel 11 in the handle 7, and having an upper inclined edge 26, within which edge 26 is provided a semicircular notch 27 near the outer end of the shank 25, as shown in Figures 1 and 3.

As shown in the drawing, the locking lever or member 18 is pivotally secured near its forward or inner end in such a manner as to eccentrically mount the circular portion 20 of the lever 18. The shank 25 is forced into the channel 11 and when the shank 25 is mounted in position within the handle, the locking member or lever 18 is swung downwardly to a clamping or locking position, shown in Figure 1, bringing the circular portion 20 into eccentric engagement with the notch 27 thereby firmly locking the shank 25 within the channel 11 of the handle 7. The parts are so designed and interfitted as to cause a definite binding action of the circular portion 20 within the notch 27 as the lever 18 is eccentrically swung upon its pivot 17 to a clamping position, such as is shown in Figure 1.

As shown in Figures 3 and 6, a transversely extending notch 28 is provided across the inner end of the handle 7 to provide spaced knife blade-engaging jaws 29 between which the inner end 30 of the blade 31 fits to assist in holding the blade against rotation with respect to the handle.

From the foregoing description, it will be seen that a very simple and efficient handle has been provided for the purpose of receiving a multiplicity of variously designed knife blades thereby permitting the removal of one type of blade from the handle to be interchanged with another type.

It will be further understood that a very simple and efficient clamping means, as well as a means for releasing the clamping means has been provided within the handle.

In actual practice, butcher shops, markets, and the like, will find this type of knife very valuable both as a time and money saver. The knife will be marketed so as to provide several blades with a handle and the blades may be regularly collected for the purpose of resharpening and may be replaced by sharpened blades for a nominal fee. In this way the user may be provided with a supply of sharp blades at all times and which may be changed rapidly, thereby saving the user much time in sharpening the blades and considerable expense in that he will not be obliged to carry a large supply of the ordinary types of knives in stock.

Having described the invention, what is claimed as new is:—

In a knife, a handle comprising side plates having marginal strips extending along their front and rear sides and across their rear ends and projecting inwardly to contact and form marginal walls for a pocket in the handle open at its front end, the strips extending along the rear side edges of said plates terminating in spaced relation to the rear end of the handle to provide a passage opening into the pocket and having an extension extending to the rear end of the handle, a latch having a circular head pivotally mounted for eccentric movement in said passage and projecting into the pocket to a latching position when the head is turned in one direction, said head having a lever projecting therefrom to seat in the extension of the passage with its outer side edge face flush with the rear side edge face of the handle and its rear end projecting from the rear end of the handle when the head is in the latching position, and a blade having a shank fitted into the pocket through the open front end thereof, the shank having its rear side edge formed with a recess spaced from its rear end and adapted to receive the head of the latch and removably secure the shank in the pocket.

EDWARD A. DUNN.